UNITED STATES PATENT OFFICE.

BERNARD S. WHITE, OF JOPLIN, MISSOURI, ASSIGNOR TO THE PICHER LEAD COMPANY, OF JOPLIN, MISSOURI, A CORPORATION OF MISSOURI.

MANUFACTURE OF BASIC LEAD SULFATE.

1,187,950.   Specification of Letters Patent.   Patented June 20, 1916.

No Drawing.   Application filed October 16, 1915. Serial No. 56,221.

*To all whom it may concern:*

Be it known that I, BERNARD S. WHITE, a citizen of the United States of America, residing in the city of Joplin, in the county of Jasper, in the State of Missouri, have invented a certain new and useful Improvement in the Manufacture of Basic Lead Sulfate, of which the following is a true and exact description.

My invention relates to the manufacture of basic lead sulfate and consists of a new process of manufacturing this substance.

Theoretically basic lead sulfate would be expressed by the formula $2PbSO_4.PbO$ and would contain 26.89 per cent. lead oxid and 73.11 per cent. lead sulfate, but wide variations in these percentages are found to be permissible and compatible with the production of a white pigment suitable for use as a pigment basis. I have indeed prepared compositions containing as low as 4 per cent. of lead oxid and others containing as high as 50 per cent. and this capacity to vary the compositions of the compound is of advantage both because it enables a composition suitable for its intended use to be made, and also because it enables a suitable compound to be made with a selection of ingredients depending on the available supply and cost.

My invention consists in the method of manufacturing the basic lead sulfate which consists in mixing lead sulfate in finely divided condition, with the very finely divided form of lead oxid formed by converting melted litharge into a fume by a hot air blast directed upon it and catching such fume or volatilized litharge in bags and subjecting the mixture to heat to induce the chemical union of the mixed substances and the formation from the mixture which is yellow in color, of a white basic lead sulfate suitable, after grinding, for use as a pigment.

I have obtained excellent results by heating the mixture to a temperature of 975° F., though it will be understood that the combination begins at lower temperatures and progresses more rapidly as the temperature increases. It is necessary, however, to keep the temperature below the point where decomposition takes place which I have found to begin in the neighborhood of 1700° F.

My invention depends for its practical success on my discovery that the volatilized litharge, which is made by subjecting the ordinary litharge in a melted condition to a high temperature which causes it to pass into the form of a fume or vapor, and catching the cooled fume in bags or screens, has by reason of its fine state of division, an intense chemical activity which results in its rapid and complete union with the lead sulfate in admixture with it and the formation of a product of extreme whiteness. These results are not obtainable with any other forms of lead oxid and depend upon the extremely fine division of the volatilized litharge and its high reactivity.

Having now described my invention, what I claim as new and desire to secure by Letters Patent is—

The method of manufacturing basic lead sulfate which consists in mixing normal lead sulfate in a finely divided condition with separately prepared finely divided litharge obtained by volatilization, and subjecting the dry mixture to heat.

BERNARD S. WHITE.